Patented Feb. 6, 1923.

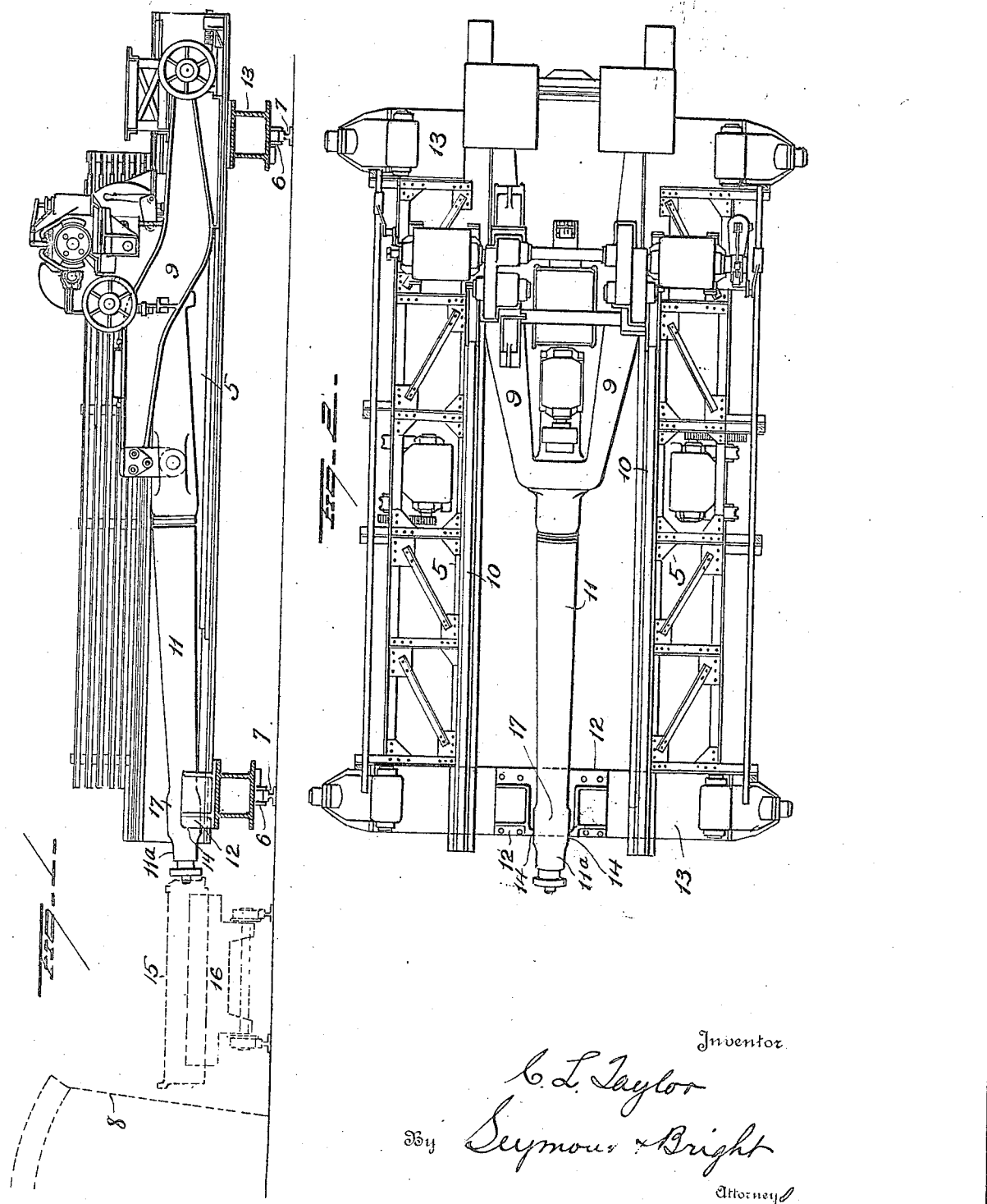

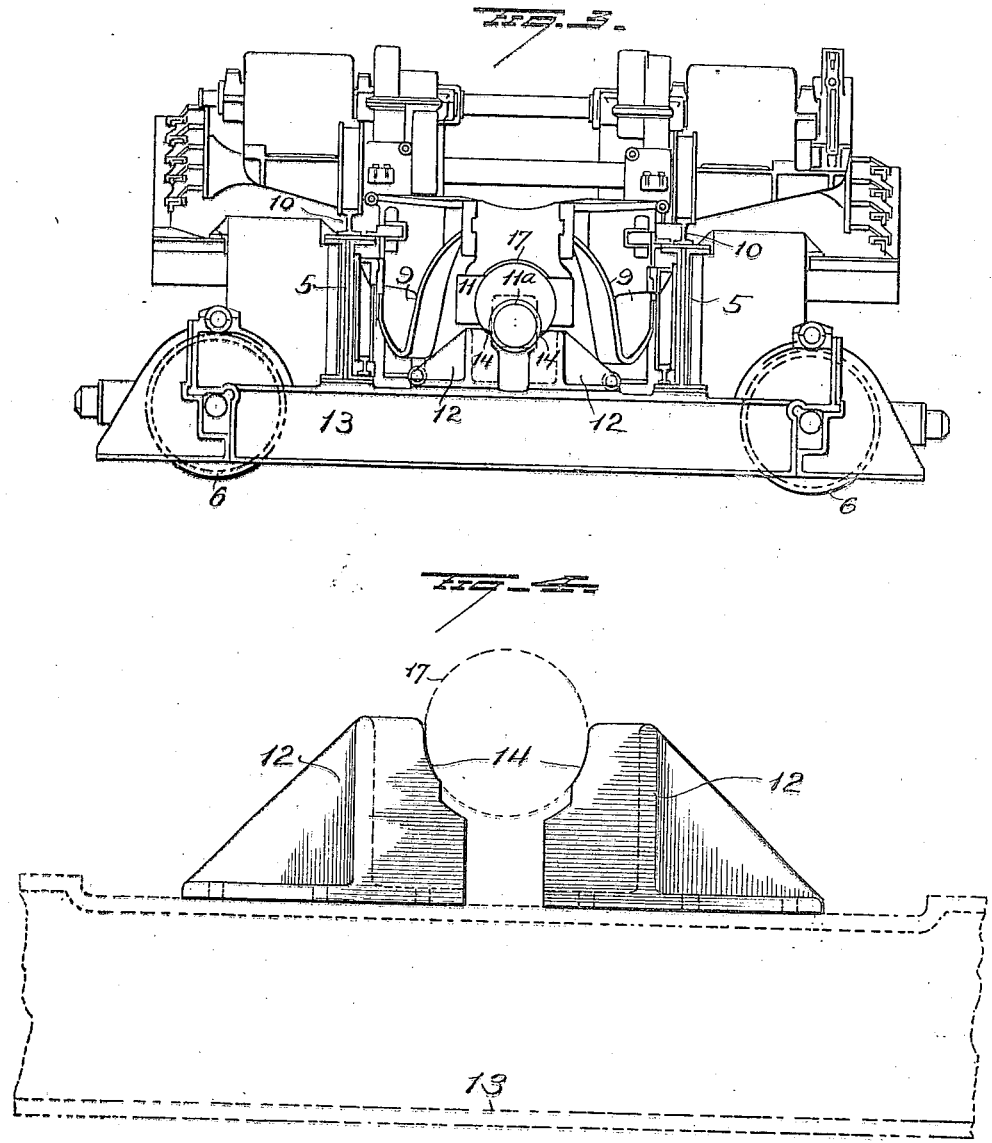

1,444,282

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

CHARGING APPARATUS FOR OPEN-HEARTH FURNACES.

Application filed October 11, 1921. Serial No. 506,975.

*To all whom it may concern:*

Be it known that I, CLARENCE L. TAYLOR, a citizen of the United States, and a resident of Alliance, in the county of Stark and State of Ohio, have invented certain new and useful Improvements in Charging Apparatus for Open-Hearth Furnaces; and I do hereby declare the following to be a full, clear, and exact description of the invention, such as will enable others skilled in the art to which it appertains to make and use the same.

My invention relates to an improvement in charging apparatus for open hearth furnaces.

Charging machines of the low down or floor type are used for pushing the charging box cars along the track between the charging machine and the furnace, the charging bar or peel of the apparatus engaging one of the boxes or a projection on the car carrying the charging boxes. As the charging bar is mounted at its rear end on a carrier and is unsupported laterally at its outer free end, it will be seen that the side thrust on the free end of the bar, when pushing a charging box car, is transmitted through the long charging bar to the charging bar carrying frame or carriage and from the latter to the rear or outer end of the main frame thus imposing severe strains on the bar supporting carriage and also to the main frame of the apparatus.

The object of this invention is to provide means for laterally supporting the free end of the charging bar when the latter is in engagement with a charging box, and transmit through said supporting means, all side stresses directly to the forward end of the main frame of the apparatus, thus relieving the bar carrying frame or carriage of all side stresses.

With this end in view my invention consists in a main frame provided at its front end or its end nearer the furnace, with a saddle or seat within which the charging bar rests when in engagement with a charging box on a car and which transmits all stresses directly to the main frame instead of to the charging bar carrying frame or carriage.

In the accompanying drawings, Figure 1 is a view in side elevation of one type of low type floor charger embodying my invention; Figure 2 is a view in plan of the same; Figure 3 a view in end elevation of the same and Figure 4 is a view of the saddle and part of the sill carrying the same.

5 represents the main frame of the charging apparatus, mounted on wheels 6 and adapted to travel on a track 7 parallel with the furnace 8; 9 is the charging bar carrying frame or carriage mounted to travel on the rails 10 on the main frame 5 and movable in a direction at right angles to the travel of the latter and 11 is the charging bar or peel carried by said carriage 9.

These parts may be of any of the well known types of charging apparatus now in use, hence a detailed description of their construction and operation is not necessary.

12 is a saddle or seat preferably made in two parts as shown in Figures 3 and 4, secured to the end truck or sill 13 of the main frame 5 and provided centrally in its upper face with a recessed curved seat 14 conforming in size to the charging bar 11 near the free end of the latter, and sufficiently deep so that when said charging bar is seated therein, it will take all side thrusts on the free end of the charging bar and transmit them directly to the end truck 13 of the main frame 5. The charging bars 11 as now used, are tapering from end to end. In order however to provide for a close fit of the bar in the saddle 12 and also to provide for limited endwise movement of the bar in the saddle to compensate for irregularity in the alinement of the boxes 15, on the car 16, I make that part of the charging bar 11 immediately in rear of its free end $11^a$, cylindrical as shown at 17 in Figure 2, so that when any part of the cylindrical section of the bar is seated in the saddle 12 it makes a close fit therewith and prevents any movement of the bar which would subject the bar carrying frame or carrier to lateral stresses.

In the operation of the apparatus, the charging bar is moved to the rear as shown in Figures 1 and 2 and its free end elevated to a position to enter the socketed end of a charging box 15 and is lowered to enter the said socket as shown in Figure 1. When in its lowered position the cylindrical part 17 of the bar 11 rests in the saddle 12, and then by moving the main frame 5 on its track 7, the car 16 carrying the charging box or boxes 15 as the case may be, will be moved along the track until the box 15 engaged by the charging bar 11 is opposite the door of the furnace 8 into which the contents of the box is to be deposited. The cylindrical section 17 of the bar 11 is of a length sufficient to compensate for any irregularity in the alinement of the boxes 15 on the car 16, and when the latter has been moved to proper position, the free end of the charging bar will be elevated to lift the box 15 from the car and then moved forwardly or toward the furnace 8 to carry the box into the latter, and is then turned, in the usual and well known manner to deposit the contents of the box into the furnace.

After the contents of the box has been deposited in the furnace, the box is withdrawn by the rearward movement of the charging bar and deposited on the car 16. If other boxes are to be discharged into the same furnace the charging bar is disengaged from the empty box and connected up with a filled box and the car 16 moved as previously explained until the filled box is opposite the furnace door and is discharged as above explained. After all the boxes have been emptied the car 16 with the empty boxes thereon is moved to a point where the latter are to be refilled and the operation repeated.

It will be seen however that when the car 16 carrying the boxes is to be shifted, the charging bar is supported adjacent its free end in the saddle 12 and all side thrust on the bar is transmitted from the saddle directly to the truck frame 13 instead of through the bar to the carrying frame 9 of the latter and from there to frame 5.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters Patent, is:—

1. In a furnace charging apparatus, the combination of a main frame, a frame carrying a charging bar, the latter adapted to have a vertical movement at its free end whereby it may be engaged with and disengaged from the socketed end of a charging box, the said charging bar carrying frame being mounted to move in a direction at right angles to the traversing movement of said main frame, and a seat on the main frame adapted to receive the charging bar and form side supports for the free end of the same.

2. In a furnace charging apparatus, the combination of a main frame, a charging bar carrying frame mounted to move thereon in a direction at right angles to the traversing movement of the main frame, a charging bar carried by said charging bar frame and adapted to have a vertical movement at its free end whereby it may be engaged with or be disengaged from a charging box, and a recessed seat secured to the outer end of said main frame and adapted to receive and form side supports for the free end of said charging bar.

3. In a furnace charging apparatus, the combination of a main frame, a charging bar carrying frame mounted to move in a direction at right angles to the traversing movement of said main frame, a charging bar carried by said charging bar frame and adapted to have a vertical movement at its free end whereby it may be engaged with or disengaged from a charging box, and a recessed seat secured to the front end of the main frame and adapted to laterally support the free end of the charging bar.

4. In a furnace charging apparatus, the combination of a main frame, a charging bar mounted to move in a direction at right angles to the traversing movement of said frame, the said bar being provided adjacent its free end with an enlarged cylindrical section and a recessed seat adapted to receive said enlarged portion of the bar and form a lateral support for the free end of the bar.

5. In a furnace charging apparatus, the combination of a main frame, a tapering charging bar mounted to move in a direction at right angles to the traversing movement of the frame and provided near its smaller free end with a cylindrical portion, and a recessed seat on the front end of the main frame adapted to receive and closely embrace the cylindrical portion of the charging bar and form side supports or abutments for the latter.

In testimony whereof, I have signed this specification in the presence of a subscribing witness.

CLARENCE L. TAYLOR.

Witness:
N. C. FETTERS.